(12) United States Patent
Aoyama et al.

(10) Patent No.: US 7,271,845 B2
(45) Date of Patent: Sep. 18, 2007

(54) CAMERA-EQUIPPED CELLULAR TELEPHONE

(75) Inventors: Sachio Aoyama, Hadano (JP); Taichi Tabata, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 699 days.

(21) Appl. No.: 10/399,597

(22) PCT Filed: May 30, 2002

(86) PCT No.: PCT/JP02/05301

§ 371 (c)(1),
(2), (4) Date: Apr. 17, 2003

(87) PCT Pub. No.: WO03/013108

PCT Pub. Date: Feb. 13, 2003

(65) Prior Publication Data

US 2004/0027474 A1    Feb. 12, 2004

(30) Foreign Application Priority Data

Jul. 31, 2001    (JP) .............................. 2001-232287

(51) Int. Cl.
*H04N 7/00*    (2006.01)

(52) U.S. Cl. ................... 348/552; 455/556.1; 455/557; 348/335; 348/207.99

(58) Field of Classification Search ................ 348/522, 348/231.2, 556.1, 231.9; 455/556.1
See application file for complete search history.

(56) References Cited

U.S. PATENT DOCUMENTS 6,388,773 B1 * 5/2002 Smith et al. ................. 358/473

2002/0013161 A1 * 1/2002 Schaeffer et al. ........... 455/557

FOREIGN PATENT DOCUMENTS

| DE | 198 06 508 A1 | 8/1999 |
|---|---|---|
| DE | 29921010 U1 | 11/1999 |
| EP | 0 796 026 A2 | 3/1997 |
| EP | 0 954 150 A2 | 4/1999 |
| EP | 0 963 100 A1 | 6/1999 |
| EP | 963100 A1 * | 12/1999 |
| JP | 4-886 | 2/1992 |
| JP | 6-98216 | 4/1994 |
| JP | 11-317793 | 11/1999 |
| JP | 2000-23125 | 1/2000 |
| JP | 2000-92360 | 3/2000 |
| JP | 2000-132071 A | 5/2000 |
| JP | 2000-201335 | 7/2000 |
| JP | 2000-332871 | 11/2000 |
| JP | 2001-045349 A | 2/2001 |
| JP | 2001-78078 | 3/2001 |

(Continued)

*Primary Examiner*—David Ometz
*Assistant Examiner*—Usman Khan
(74) *Attorney, Agent, or Firm*—Pearne & Gordon LLP (57) ABSTRACT

Cell phone apparatus with camera capabilities characterized in that the cell phone apparatus with camera capabilities includes a shooting section for shooting a picture, a reclosable lens cover for protecting the shooting lens of the shooting section, detecting means for detecting opening/closing of the lens cover, a memory for storing information on presetting of a plurality of modes where various features are set, and a controller for switching to a preset mode among a plurality of modes stored in the memory on detecting that the lens cover is open. This provides easy-to-use cell phone apparatus with camera capabilities in both the cell phone mode and the camera mode without causing misunderstanding or unnecessary guard on the side of others in photography shooting.

8 Claims, 4 Drawing Sheets

FOREIGN PATENT DOCUMENTS

| | | |
|---|---|---|
| JP | 2001-128041 | 5/2001 |
| JP | 2002-158909 | 5/2002 |
| JP | 2002-300257 | 10/2002 |
| JP | 2002-354082 | 12/2002 |
| WO | WO 01/31894 | 5/2001 |

* cited by examiner

CAMERA-EQUIPPED CELLULAR TELEPHONE

TECHNICAL FIELD

The present invention relates to cell phone apparatus with camera capabilities, and in particular to cell phone apparatus with camera capabilities which can register a picture taken with the camera into a RAM or onto an IC card provided on the cell phone apparatus.

BACKGROUND OF THE INVENTION

Recently, cell phone apparatus with camera capabilities (hereinafter referred to as a cell phone with camera capabilities) has been developed which registers a picture taken with the cell phone with camera capabilities and uses the picture registered as a standby screen in the display section or transmits the picture to another cell phone by using the cell phone with camera capabilities.

However, in general, in the cell phone with camera capabilities, the camera lens is always exposed. Even when it is used as a cell phone and not as a camera, whether it is used as a cell phone or a camera is not easy to understand by other people.

Thus, it is possible to shoot others secretly by pretending to use the cell phone with camera capabilities as a cell phone. This may cause others to be cautious unnecessarily or cause misunderstanding of others. Thus the cell phone has a problem when it is used as a camera.

The cell phone with camera capabilities has both a cell phone feature (cell phone mode) in which the cell phone is used as a cell phone and a camera feature (camera mode) in which the cell phone is used as a camera. The cell phone with camera capabilities is very effective by alternating its modes.

In case the user of the cell phone with camera capabilities takes time in an attempt to switch from the cell phone mode to the camera mode in a complicated way, for example, he/she may miss the perfect moment for a good picture. It may happen that he/she pressed a wrong operation button or actually missed shooting although he/she surely took a picture.

Further, there is an increasing need to develop a cell phone with camera capabilities which provides easy-to-understand and convenient procedure and setting on how to capture a picture taken or handle call operation for example when an incoming call is indicated while shooting is under way in the camera mode.

DISCLOSURE OF THE INVENTION

In view of the situation, this patent application aims at providing cell phone apparatus with camera capabilities which assures convenient procedure and setting in both a cell phone mode and a camera mode, without causing misunderstanding and unnecessary guard on the side of others in shooting.

First, the invention is cell phone apparatus with camera capabilities characterized in that the cell phone apparatus with camera capabilities comprises a shooting section for shooting a picture, a reclosable lens cover for protecting the shooting lens of the shooting section, detecting means for detecting opening/closing of the lens cover, a memory for storing information on presetting of a plurality of modes where various features are set, and a controller for switching to a preset mode among a plurality of modes stored in the memory on detecting that the lens cover is open.

By checking opening/closing of the lens cover with his/her own eyes, any user can check whether the cell phone apparatus with camera capabilities is engaged in shooting. This eliminates misunderstanding or unnecessary guard on the side of others in shooting in the camera mode.

Second, the controller preferably switches from the cell phone mode to the camera mode on detecting that the lens cover is open, and switches from the camera mode to the cell phone mode on detecting that the lens cover is closed.

Same as the first aspect of the invention, by checking opening/closing of the lens cover with his/her own eyes, any user can check whether the cell phone apparatus with camera capabilities is engaged in shooting. This eliminates misunderstanding or unnecessary guard on the side of others in shooting in the camera mode.

Third, the controller preferably switches from the camera mode to the cell phone mode on detecting that the lens cover is closed, and switches from the camera mode to the cell phone mode as well as switches the roles of the keys used in the cell phone mode to those of the keys used in the camera mode on detecting that the lens cover is open.

Fourth, the controller preferably retrieves presence/absence of a picture temporarily stored in the camera mode, and in case the picture is present, asks the user whether this picture needs registration and issues an instruction for the user to register of erase the temporary stored picture data via choice of the user.

This allows a quick response to an incoming call even while shooting is under way in the camera mode and storage/registration of a picture taken already shot when the cell phone mode is entered, after the call is terminated.

In the figures, a numeral 1 represents a cell phone with camera capabilities, 10 an enclosure, 11 an audio codec, 12 a channel codec, 13 an SWIC, 14 a diversity antenna, 15 a display, 16 an operating section, 16A and 16C shutter keys, 16B and 16D cancel keys, 2 a mouthpiece section, 21 a microphone, 22 a modulating section, 23 a transmitting section, 3 an earpiece section, 31 a receiving section, 32 a demodulating section, 33 a receiver, 34 a speaker, 4 a shooting section, 41 a lens cover, 41A a confirmation window, 42 an imaging lens, 43 a shooting element, 5 a detecting section (detecting means), 6 a lamp, 7 a memory, 8 a controller, and 9 a power source.

BEST MODE FOR CARRYING OUT THE INVENTION

An embodiment of the invention will be described in detail referring to the attached drawings.

Figure 1:
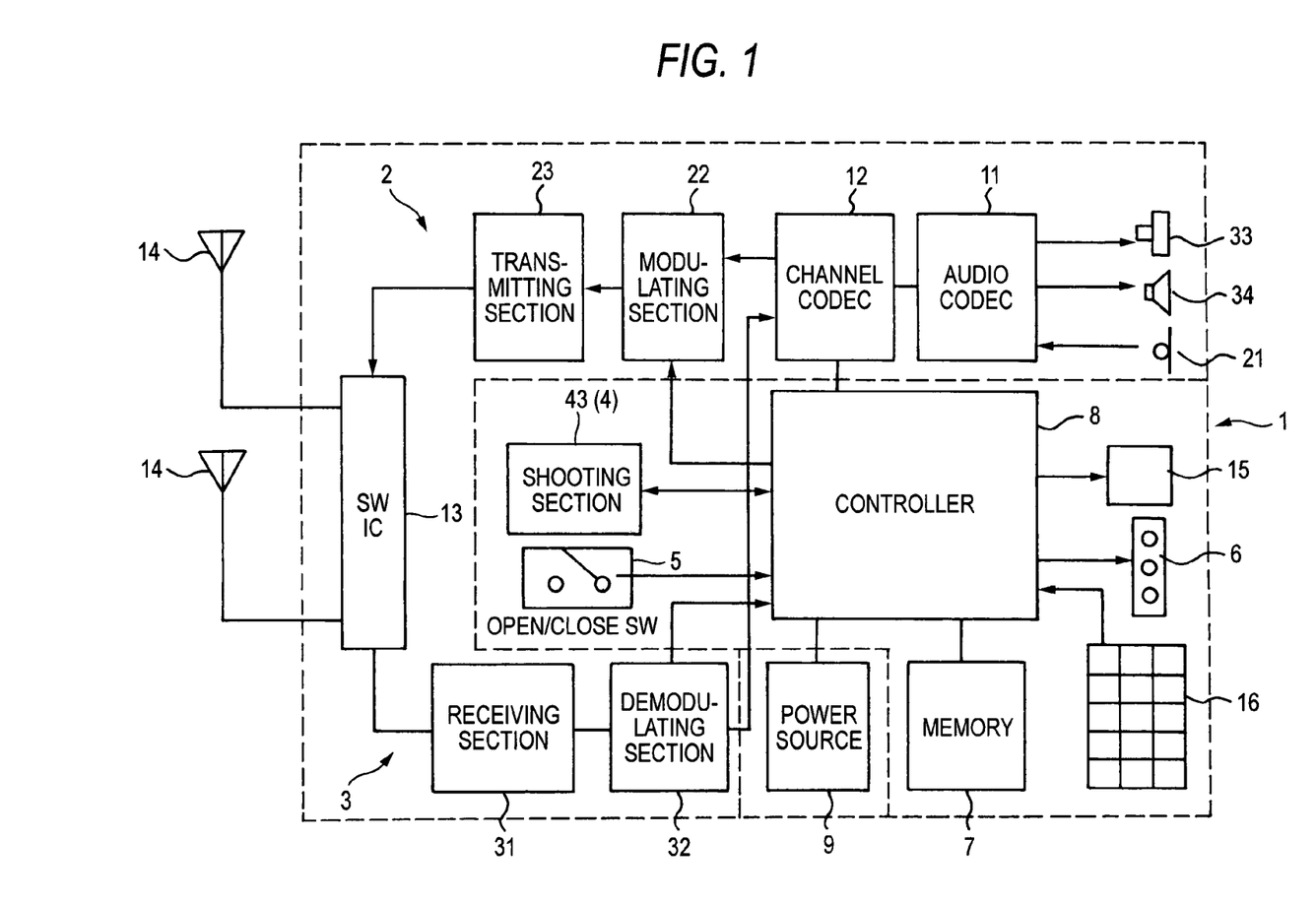
FIG. 1 is a block diagram of showing the electric configuration of a cell phone with camera capabilities according to an embodiment of the invention.

FIG. 1 shows a cell phone with camera capabilities to which the cell phone apparatus with camera capabilities of the invention is applied. The cell phone with camera capabilities 1 according to this embodiment comprises a display 15, an operating section 16, a mouthpiece section 2, an earpiece section 3, as well as a shooting section 4, a lens cover 41 provided on the shooting section 4, a detecting section (detecting means) 5, a lamp 6, a memory 7, a controller 8, and a power source 9.

On the display 15 is displayed an ordinary cell phone standby screen in case the cell phone with camera capabilities is set to the cell phone mode. In case it is set to the camera mode, a picture to be taken with the camera and a temporarily stored picture may be displayed. On the display 15 is also displayed an inquiry about whether the temporarily stored picture is to be registered or erased.

Setting is allowed where pictures already taken are retrieved and displayed or pictures taken are displayed in the order they are taken in setting the camera mode. A picture displayed on the display is in the ordinary portrait orientation (the longitudinal direction of the enclosure 10 is arranged in vertical direction). In the camera mode, as shown in FIG. 3A, screen display in landscape orientation (the transverse direction of the enclosure 10 is arranged in vertical direction) is allowed.

Figure 3:
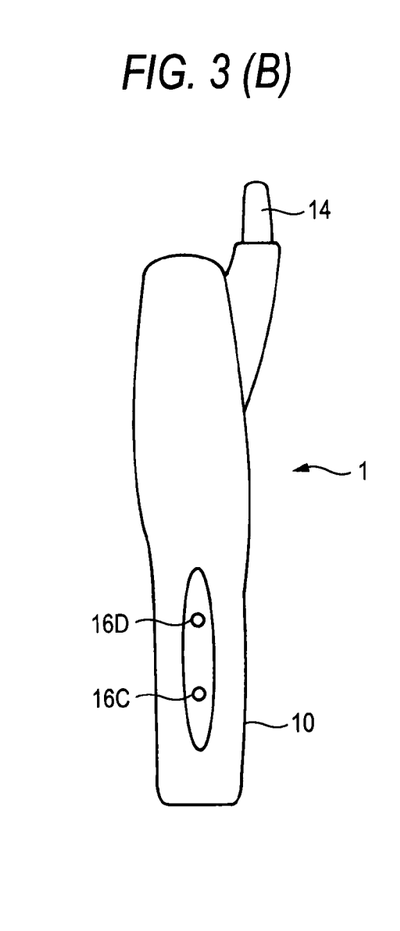
FIG. 3A is a front view of the cell phone with camera capabilities according to this embodiment.
FIG. 3B is a side view of the cell phone with camera capabilities according to this embodiment.

On the operating section 16 are provided keys and buttons used for operation as an ordinary cell phone in setting of the cell phone mode, as shown in FIG. 3. The specific keys 16A, 16B serve as a shutter key and a cancellation key for canceling a temporarily stored picture respectively in setting of the camera mode. The shutter key 16A and the cancellation key 16B are mainly used to take a picture of the user himself/herself.

The dedicated shutter keys 16C and the dedicated cancellation key 16D are respectively provided on the sides of the enclosure 10 of the cell phone and mainly used to shoot the front scenery with the camera placed in landscape orientation. Which of the shutter key 16A, the cancellation key 16B, as well as the shutter key 16C and the cancellation key 16D will be used may be chosen at command depending on which keys are easier to use.

In the mouthpiece section 2, for example a voice of the user issued from a capacitor microphone 21 is converted to a sound signal via the microphone 21, output to the transmitting section 23 via the channel codec 12 and the modulating section 22, then transmitted on the SWIC 13 to a distant party from the diversity antenna 14.

The earpiece section 3, receiving a transmit signal from the distant party on the receiving section 31 by way of the SWIC 13 via the diversity antenna 14, hears the sound of the distant party from the receiver 33 and the speaker 34 via the demodulating section 32 and the channel codec 12 and the audio codec 11.

Figure 2:
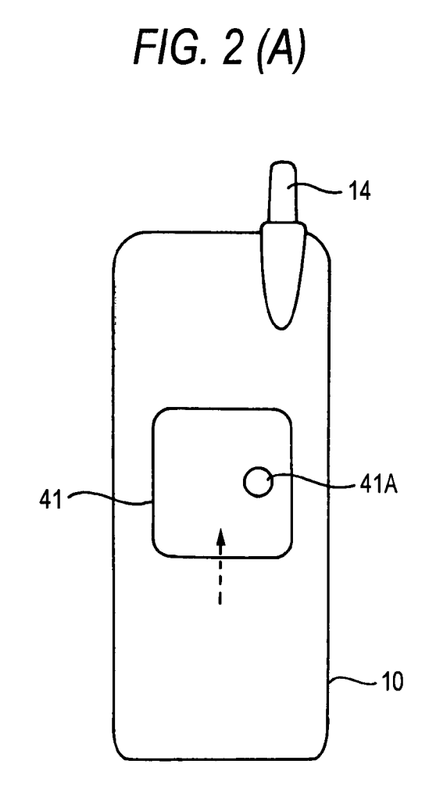
FIG. 2A shows a rear view of the cell phone with camera capabilities according to this embodiment with the lens cover closed.
FIG. 2B is a rear view of the cell phone with camera capabilities according to this embodiment with the lens cover open.

The shooting section 4, as shown in FIG. 2, comprises an imaging lens 42 at the rear face opposite to the front face where the display 15 and the operating section 16 are provided. A picture taken is imaged onto a shooting element 43 such as a CCD via the imaging lens 42. In the shooting section 4 of this embodiment, by pressing one of the shutter keys 16A and 16C again after pressing one of the shutter keys 16A and 16C, a picture taken is stored into the memory 7.

The shooting section 4 comprises a lens cover 41 for exposing or covering the imaging lens 42 in order to protect the imaging lens 42 externally and to notify a third party such as a subject of shooting including other people in the neighborhood that the cell phone is in the state where shooting is in progress or possible (camera mode).

While the shutter key 16A or 16C is pressed twice to register a picture taken into the memory 7 in this embodiment, for example, the shutter key 16A or 16C may be pressed once to temporarily store the picture taken, then the shutter key 16A or 16C may be pressed again to register the picture.

The lens cover 41 manually slides in parallel with the longitudinal direction of the enclosure 10 (in vertical direction in FIG. 2). The lens cover 41 and the enclosure 10 are provided with the detecting section 5 for detecting via a magnetic sensor the open/close state when the lens cover 41 is moved to a predetermined close position or a predetermined open position and outputting a detection signal to the controller 8.

The memory 7 is used to register a picture taken on the shooting section 4. While the memory 7 registers only still pictures using the controller 8 in this embodiment, the memory 7 may register moving pictures as well. A plurality of modes to be set by the user are registered and stored into the memory 7 in both the cell phone mode and the camera mode. In this embodiment, for example, the four auxiliary modes (hereinafter referred to as four mode types) are stored and registered:

(I) Camera Mode and Call-Origination/Termination-Inhibited (Out of Coverage) Mode (Hereinafter Referred to as the First Mode)

<Call Termination>

Call termination is not permitted and the cell phone stays in the camera mode because of the setting of call-termination-inhibited.

<Call Origination>

The cell phone does not enter the cell phone mode with the key operation on the operating section 16. A call may be originated in the cell phone mode with the lens cover 41 closed.

(II) Camera Mode and Call-Termination-Inhibited (Camera Only) Mode (Hereinafter Referred to as the Second Mode)

<Call Termination>

Call termination is not permitted and the cell phone stays in the camera mode because of the setting of call-termination-inhibited.

<Call Origination>

(1) Numeric key operation or retrieval of a telephone number automatically places the cell phone in the cell phone mode (the lens cover 41 stays open).

(2) Pressing the cancellation key or termination of a call automatically restores the cell phone to the camera mode.

(3) When the camera mode is entered, whether there is a temporarily stored picture is detected.

(4) A screen is displayed to inquire about whether to register the temporarily stored picture into the memory 7.

(5) Key operation of the user chooses whether to register the temporarily stored picture into the memory 7 or erase the picture.

(III) Camera Mode and Manner Mode (Hereinafter Referred to as the Third Mode)

<Call Termination>

(1) The cell phone stays in the camera mode, without entering the cell phone mode, even when there is an incoming call.

(2) Pressing the cancellation key or termination of a call automatically restores the cell phone to the camera mode.

(3) When the camera mode is entered, whether there is a temporarily stored picture is detected (4) A guidance to prompt the distant party to record a message is automatically provided.

(5) The message of the distant party is registered into the memory 7.

<Call Origination>

Same as the call-termination-inhibited mode.

(IV) Camera Mode and Ordinary Mode (Hereinafter Referred to as the Fourth Mode)

<Call Termination>

(1) The cell phone automatically enters the cell phone on call terminating. Pressing the termination button allows the user to be engaged in the call (the lens cover 41 stays open)

(2) Termination of a call automatically restores the cell phone to the camera mode.

(3) When the camera mode is entered, whether there is a temporarily stored picture is detected.

(4) A screen is displayed to inquire about whether to register the temporarily stored picture into the memory 7.

(5) Key operation of the user chooses whether to register the temporarily stored picture into the memory 7 or erase the picture.

<Call Origination>

Same as the call-termination-inhibited mode.

The controller 8 automatically switches over the preset modes depending on the opening/closing of the lens cover 41. For example, when the detecting section 5 has detected that the lens cover 41 is open, the cell phone enters the camera mode. In the camera mode, usually, unless the user does not choose another mode, the cell phone is controlled to choose a mode preset in advance among the four mode types stored in the memory 7.

Similarly, the controller 8, when the detecting section 5 has detected that the lens cover 41 is closed, places the cell phone in the cell phone mode. In the cell phone mode, same as the camera mode, the cell phone is controlled to choose a mode preset in advance among the four mode types stored in the memory 7. In case a preset mode is not specified, the ordinary mode is chosen.

The controller 8, when the lens cover 41 is open and the cell phone has entered the camera mode, switches the roles (features) of the keys used in the cell phone mode to those of the keys used in the camera mode. When the lens cover is closed and the cell phone has entered the cell phone mode, the controller 8 chooses the roles (features) of the keys used in the cell phone mode.

The controller 8 retrieves presence/absence of a picture temporarily stored in the camera mode, and in case there is a temporarily stored picture, displays a screen to inquire about whether to register the temporarily stored picture on the display 15 and issues an instruction for the user to register or erase the temporarily stored picture data through section by the user on the screen.

The controller 8, in case the third or fourth mode of the four mode types is preset, when there is an incoming call from a third party with a picture taken being temporarily stored, interrupts shooting operation and performs call processing preferentially and temporarily.

The modes of the cell phone in this embodiment will be described.

(A) Camera Mode:

In the camera mode, when the user opens the lens cover 41 with his/her hands, that event is detected by the detecting section 5 and the controller 8 sets the camera mode. When the enclosure 10 and the lens 42 are oriented toward the object of shooting, the target picture is displayed on the display 15. When the user presses the shutter button 16B, a desired picture is taken and the picture may be registered into the memory 7.

(B) Cell Phone Mode:

In the cell phone mode, when the user closes the lens cover 41, that event is detected by the detecting section 5 and the controller 8 sets the keys and buttons on the operating section 16 to the features used in the ordinary cell phone operation. The user may use the cell phone as a cell phone by operating the keys and buttons on the operating section 16.

The operation of the cell phone in this embodiment will be described referring to the flowchart of FIG. 4.

In this example, modes to be automatically chosen in the cell phone mode and the camera mode among the first through fourth modes are chosen as required in advance and registered by using the mode setting key on the operating section 16.

Mode presetting is made as mentioned earlier (step S1) The mode presetting is allowed anytime irrespective of the opening or closing of the lens cover 41. In this state, it is determined whether the lens cover 41 is open or closed (step S2). In case the lens cover 41 is open, the cell phone enters the camera mode and execution proceeds to step S10 and the subsequent steps. In case the lens cover 41 is closed, the cell phone enters the cell phone mode and execution proceeds to step S21 and the subsequent steps.

The camera mode refers to a state where specific keys are operational as necessary keys for a camera and the camera feature is active. In this state, the user cannot release the shutter.

The shutter keys 16A, 16C are push keys of a two-stage type. In the first stage, a picture is temporarily stored, that is, a moving picture taken with the camera is temporarily stored as a still picture at the moment into a register. In the second stage, the temporarily stored picture is formally registered and stored into the memory 7. Pressing the shutter key into the first and second stages in a row accelerates the operation, thus finally registering and storing the formal picture at the moment into the memory 7.

When the cell phone is in the camera mode in step S10, it is determined whether there is a temporarily stored picture (step S11). In case there is not a temporarily stored picture, execution proceeds to step S15 to allow shooting with a camera, that is, releasing the shutter to perform photography shooting. In case there is a temporarily stored picture, a screen appears to inquire about whether to store the picture, and it is determined whether the picture is to be stored (step S12).

When the user chooses to store the picture according to the screen to inquire whether to store the picture, the temporarily stored picture is stored into the memory (step S13) thus placing the cell phone in the shooting-ready state in step S15. On the other hand, when the user does not choose to store the picture, the temporarily stored picture is erased (step 14), then placing the cell phone in the shooting-ready state. It is possible to quit the screen without erasing the temporarily stored picture after choosing not to store the picture. In case the shutter is operated for photography shooting and the pictures taken at the moment are temporarily stored, the pictures already in the memory are erased in the chronological order they are stored. The number of pictures to be temporarily stored is in general one. This is sufficient but it is also possible to temporarily store a plurality of pictures and erase and overwrite the pictures in the chronological order.

When the cell phone is in the shooting-ready state in step S15, it is determined which auxiliary mode has been preset (step S16), then one of the steps S17 through S20 is followed. In this embodiment, the cell phone feature operates in the four states depending on the mode presetting even in the shooting-ready state. The cell phone feature preferentially operates in one of the four modes, first to four modes described below, depending on the preset mode.

First Mode (Step S17)

Both call origination and call termination are inhibited. In this state, the telephone feature is not available at all. An incoming call is neglected and an attempt to originate a call is rejected. When the user wishes to activate the telephone feature, he/she must preset another mode or close the lens cover 41.

Second Mode (Step S18)

Call origination is permitted while call termination is inhibited. The user can originate a call by operating a ten-key pad with an arbitrary timing. Shooting with a camera is available while conversation is in progress and the user can transmit a picture taken to the distant party in the meantime. It is possible to inhibit shooting while conversation is in progress and place the cell phone in the shooting-ready state after the call is over.

Third Mode (Step S19)

Call origination is permitted. Call termination is permitted only in the manner mode. Call origination is available by operating the ten-keypad, same as the second mode. The manner mode refers to a mode where a ringing tone is silenced in general and a vibrator is used instead to signal call termination. Various settings are available, such as conversation through lower voice with the microphone sensitivity increased or a so-called phone-answering machine feature whereby leaving the incoming call unanswered transmits a recorded announcement to prompt the caller to leave a message. Same as the second mode, shooting with a camera is available while conversation is in progress.

Fourth Mode (Step S20)

Both call origination and call termination are possible. Call origination and call termination are given priority over photography shooting in progress. Same as the second mode and the third mode, shooting with a camera is available and the user can transmit a picture taken to the distant party while conversation is in progress.

Operation of call termination is similar to that of call origination. A ringing tone sounds on call termination. The user operates an off-hook key to answer the incoming call and is engaged in the call. The user can transmit a picture taken to the distant party while conversation is in progress. It is possible to inhibit shooting while conversation is in progress and place the cell phone in the shooting-ready state after the call is over. Any operation is accepted as long as the cell phone is placed is the shooting-ready state when a call is over and the telephone line is released.

In case the lens cover 41 is closed in step S2, execution proceeds to step S21 to place the cell phone in the cell phone mode where the camera feature is inactive. In this practice, it is determined whether the lens cover 41 has changed from the open state to the closed state, that is, whether the lens cover 41 was open before it was closed (step S22). In case it was open before it was closed, there could be a temporarily stored picture. Thus, it is determined whether there remains a temporarily stored picture (step S23).

In case such a temporarily stored picture is found, a screen appears to inquire about whether to store the temporarily stored picture and the user determines whether to store the picture (step S24). When the user has chosen to store the picture according to the screen to inquire whether to store the picture, the temporarily stored picture is stored into the memory (step S25). When the user has chosen not to store the picture, the temporarily stored picture is erased (step S26). Finally, the cell phone enters the state in step S27 where both call origination and call termination are permitted. In this state, it is also possible to allow pictures registered in the memory to be read out and transmitted to the distant party while conversation is in progress although the camera is not operational.

In the aforementioned procedure, if wishing to change modes, the user can follow the mode presetting step to change the preset mode at any time. The user can arbitrarily choose between the camera mode and the cell phone mode by opening or closing the lens cover 41 as required.

Figure 4:
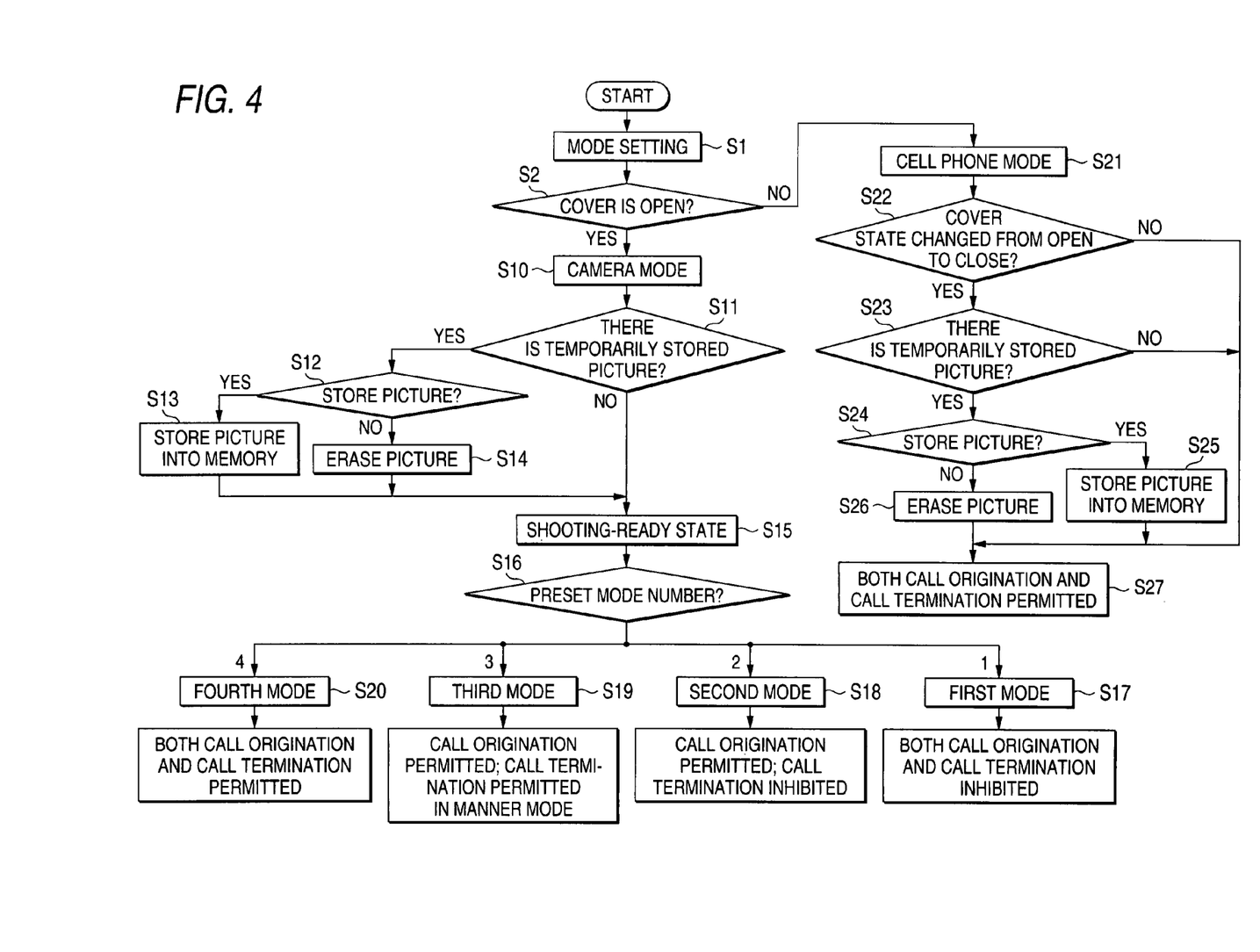
FIG. 4 is a flowchart showing the operation of the cell phone with camera capabilities according to this embodiment.

While execution returns to step S27 after following steps S25 and S26 to allow call origination and call termination in FIG. 4, execution may proceed to step S16 and then one of the steps S17, S18, S19 and S20 depending on the mode preset in step S1.

While the invention has been described in detail and referring to its specific embodiments, those skilled in the art will recognize that various changes and modifications can be made in it without departing from the spirit and scope thereof.

This patent application is based on the Japanese Patent Application No. 2001-232287 filed Jul. 31, 2001, which is incorporated herein by reference.

INDUSTRIAL APPLICABILITY

As mentioned hereinabove, the invention provides cell phone apparatus with camera capabilities comprising a shooting section, a reclosable lens cover for protecting the shooting lens, detecting means for detecting opening/closing of the lens cover, and a controller for switching to a preset mode among a plurality of modes on detecting that the lens cover is open. The cell phone apparatus with camera capabilities performs photography shooting with this lens cover open. Other people see the open lens cover and recognize that photography shooting is under way. This eliminates misunderstanding such as being photographed secretly or unnecessary guard on the side of others in shooting in the camera mode.

According to the invention, it is possible to suspend shooting and answer an incoming call even when the call is terminated and the cell phone apparatus with camera capabilities is rung. Also, it is possible to concentrate on registration of a picture taken in the suspended shooting, after the call is over, with sufficient lead time, without being prodded by ringing. Thus it is possible to provide easy-to-use cell phone apparatus with camera capabilities in both the cell phone mode and the camera mode.

The invention claimed is:

1. A cell phone apparatus with camera capabilities, comprising:
   a main body that has a first face and a second face opposite to the first face;
   a display section that is provided on the first face;
   an operating section that is provided on the first face;
   an image capturing section that captures an image, and that is provided on the second face;
   a lens cover that is provided on the second face, and that is arranged to expose and cover a lens of the image capturing section; and a controller that switches between a camera mode for capturing the image and a cell phone mode in direct relation to the lens cover exposing and covering the lens, respectively.

2. The cell phone apparatus according to claim 1, further comprising:

a shutter key that is provided on a side face of the main body, wherein the controller sets a function of operating the image capturing section on the shutter key in the camera mode; and wherein the controller sets a function of operating the cell phone apparatus on the shutter key in the cell phone mode.

3. The cell phone apparatus according to claim 1, wherein the controller generates information that represents whether to register a temporarily stored image in a memory when it is determined that the temporarily stored image present.

4. The cell phone apparatus according to claim 1, wherein the controller determines presence/absence of a temporarily stored image when the controller switches from the cell phone mode to the camera mode; and wherein the controller displays an inquiry image that represents whether to register the temporarily stored image in a memory when it is determined that the temporarily stored image is present.

5. The cell phone apparatus according to claim 3, wherein the controller determines presence/absence of the temporarily stored image when the controller switches from the cell phone mode to the camera mode.

6. The cell phone apparatus according to claim 3, wherein the controller registers or deletes the temporarily stored image based on a response to the information.

7. A cell phone apparatus with cameral capabilities comprising:

a main body;

an image capturing section provided on the main body and operable to capture an image;

a lens cover provided on the main body and operable to alternatively expose and cover a lens of the image capturing section; and a controller operable to switch between a camera mode and a cell phone mode in direct relation to the lens cover exposing and covering the lens, respectively.

8. A cell phone apparatus with cameral capabilities comprising:

a main body;

an image capturing section provided on the main body and operable to capture an image;

a lens cover provided on the main body and operable to alternatively expose and cover a lens of the image capturing section; and a controller operable to switch between a camera mode and a cell phone mode automatically in relation to the lens cover exposing and covering the lens, respectively.

* * * * *